United States Patent [19]

Sawamura et al.

[11] Patent Number: 4,578,322

[45] Date of Patent: Mar. 25, 1986

[54] RECORDING MEDIUM

[75] Inventors: Mitsuharu Sawamura, Yokohama; Susumu Ito, Tokyo; Masaaki Matsushima, Machida; Hiroyoshi Kishi, Tokyo; Eizo Sasamori, Yokohama; Satoshi Yoshihara; Shigeharu Iijima, both of Kawasaki; Katsuhiko Takano, Yokohama, all of Japan

[73] Assignee: Canon Kabushiki Kaisha, Tokyo, Japan

[21] Appl. No.: 620,806

[22] Filed: Jun. 14, 1985

[30] Foreign Application Priority Data

Jun. 16, 1983 [JP] Japan ................. 58-108490

[51] Int. Cl.$^4$ ............................................. G11B 9/00
[52] U.S. Cl. ................... 428/694; 346/135.1; 360/131; 360/135; 365/122; 369/286; 369/283; 428/900; 430/270; 430/945
[58] Field of Search ............ 428/64, 65, 692, 694, 428/900; 360/131, 135; 365/122; 430/270, 945; 346/135.1, 137; 369/286, 283

[56] References Cited

U.S. PATENT DOCUMENTS 4,450,553 5/1984 Holster et al. ................ 369/286
4,518,657 5/1985 Yanagida ..................... 428/694

OTHER PUBLICATIONS

"Nonvolatile Magneto-Optical Memory Element", Almasi et al., IBM Tech. Dis. Bull., vol. 14(1), 342 (1971).

Primary Examiner—George F. Lesmes
Assistant Examiner—William M. Atkinson
Attorney, Agent, or Firm—Fitzpatrick, Cella, Harper & Scinto

[57] ABSTRACT

A recording medium is provided which comprises (a) a first recording layer; (b) a second recording layer provided in contiguity to the first recording layer; and (c) a separation layer for spatially separating the first and second recording layer. The first recording layer has a sufficient film thickness not to permit the recording to be effected on the second recording layer, while the recording operation is performed on the first recording layer, and the recording operation is effected on the second recording layer at positions corresponding to defective portions in the first recording layer.

2 Claims, 5 Drawing Figures

RECORDING MEDIUM

BACKGROUND OF THE INVENTION

1. Field of the Invention

This invention relates to a recording medium, on which to record information.

2. Description of the Prior Art

While microfilms have so far been used as the medium for high density recording of information, various other versions of recording medium such as high density magnetic recording medium, optical memory medium, and so forth have been brought to attention of all concerned as the medium for electronic files. For instance, amorphous alloy films composed of rare earth metals and transition metals has been known to be useful as the magneto-optical recording medium. Of these materials, GdTbFe has a large Kerr rotational angle and a Curie point of 150° C. or so, hence it provides a recording medium excellent in its write-in and read-out efficiency. GdTbFe, however, is inferior in its corrosion-resistance as is the case with other amorphous magnetic materials, which causes not only deterioration in the magnetic characteristics in a highly humid atmosphere, but also increase in number of pin hole in apperance. As the measures for preventing such corrosion or increase in the pin holes from taking place, there have been adopted various methods such as, for example, providing a protective layer on the magnetic layer, sticking the layers with a moisture-resistance adhesive layer, and so forth. These preventive measures are also not able to attain perfect elimination of the abovementioned corrosion or increase in the pin holes, nor produce any effect against the pin holes to be generated in the course of forming the magnetic layer.

As such, occurrence of the defects in the recording layer at its formation or after its formation is not limited to the abovementioned magneto-optical recording medium, but also they tend to occur in those heat-mode recording mediums of bismuth-, rhodium-, tellurium-, or organic-compound-series, wherein information is recorded in the form of pits, or in those recording mediums which change their form upon heat application. In such defective portion in the recording medium, no information can be recorded, which is represented as the so-called "error-rate".

FIG. 1 of the accompanying drawing illustrates one embodiment of the conventional magneto-optical recording medium. In the drawing, a reference numeral 1a designates a glass or plastic substrate, on which a reflection preventive layer 2a, a magnetic layer 3a, and a protective layer 4 are sequentially formed by the vacuum deposition or sputtering or other methods, and then another substrate 1b of glass or plastic is sticked onto the protective layer 4 through an adhesive layer 5. In this laminar structure, the reflection preventive film 2a is of $ZrO_2$ having a refractive index of 2.0, the magnetic layer 3a is of GdTbFeCo having a complex refractive index of 2.53–i3.31 for a wavelength of 800 nm, and the protective layer 4 is of SiO having the refractive index of 1.7.

FIG. 2 shows a spectral reflectance in case the substrate at the reading side of the recording medium is of sheet glass, it being understood that the surface reflection of the glass plate is not included. An optical film thickness of the reflection preventive layer 2a is approximately 160 nm, which corresponds to a quarter of the wavelength of 800 nm in taking a phase shift to occur at the interface between the reflection preventive layer 2a and the magnetic layer 3a into consideration. The magnetic layer 3a has a thickness of about 100 nm, which does not permit light to pass through it. In the conventional structure as shown in FIG. 1, where the magnetic layer 3a contains pin holes, there are no write-in and read-out operations to be done possibly as a matter of course.

SUMMARY OF THE INVENTION

It is an object of the present invention to provide an improved recording medium with the least error rate and free from the abovementioned disadvantages. According to the present invention, there is provided a recording medium, comprising: (a) a first recording layer; (b) a second recording layer provided in contiguity to said first recording layer; and (c) a separation layer for spatially separating said first and second recording layer, said first recording layer having a sufficient film thickness not to permit the recording to be effected on said second recording layer, while the recording operation is performed on said first recording layer, and said recording operation being effected on said second recording layer at positions corresponding to defective portions in said first recording layer.

DETAILED DESCRIPITON OF PREFERRED EMBODIMENTS

Figure 1:
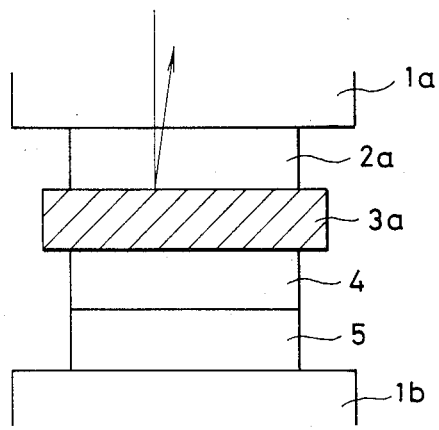
FIG. 1 is a schematic diagram showing one embodimental construction of a magneto-optical recording medium as a conventional recording medium.

The recording medium of the present invention has a first recording layer and a second recording layer, the latter being capable of taking the place of the former when defects have occurred in the former. This second recording layer is provided in contiguity to the first recording layer so that the recording can be eventually made on this second recording layer in case the first recording layer becomes incapable of recording on it.

In the recording medium which performs recording and reproducing with use of light beam to be described later, there is provided a layer for spatially separating the first recording layer and the second recording layer. This separating layer functions not only to spatially separate both recording layers, but also to enable the second recording layer to carry out the recording and the reproduction with the exactly same resulting effect as is the case with performing the recording and reproduction with the light beam on the first recording layer.

In the following, the present invention will be described in specific details with reference to the preferred embodiment as shown in the drawing.

Figure 3A:
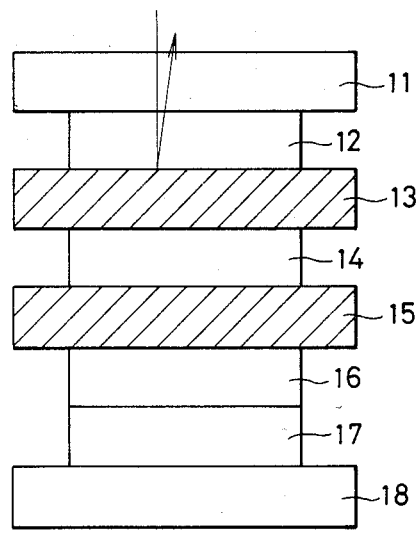
FIGS. 3A and 3B illustrate the construction of the magneto-optical recording medium according to a preferred embodiment of the recording medium of the present invention.
Figure 3B:
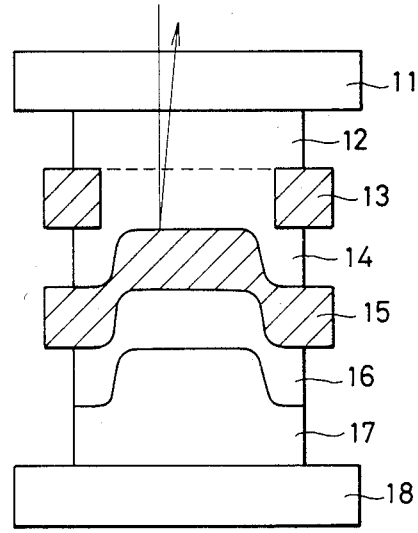

FIGS. 3A and 3B illustrate one embodiment of the magneto-optical recording medium according to the present invention, wherein FIG. 3A shows a state of the first recording layer free from defect such as pinholes, etc., and FIG. 3B shows a state of the first recording layer with such defect therein.

In the drawing, a reference numeral 11 designates a substrate made of glass or plastics; a numeral 12 refers to a reflection-preventive layer deposited on the substrate 11; a numeral 13 represents a magnetic layer as the first recording layer over the reflection-preventive layer 12; a reference numeral 14 denotes a spacer layer which is transmitting to recording light beam, and has an optical film thickness of an integral multiple of one half of a wavelength $\lambda$ of the recording light beam (in general, a thickness of $\lambda/2$); a numeral 15 refers to another magnetic layer as the second recording layer; 16 protective layer; 17 an adhesive layer; and 18 another substrate made of glass or plastics or others. FIG. 3B shows the pin hole occurred in the first recording layer, on which information is recorded by light beam. In this case, the write-in and read-out of information can be done by the second magnetic layer 15 underneath the first magnetic layer 13. The spacer layer 14 shown in FIGS. 3A and 3B has the functions of not only separating the first magnetic layer 13 and the second magnetic layer 15, but also preventing decrease in the efficiency of the write-in and read-out operations ascribable to such pin-hole defect by rendering the optical film thickness of the spacer layer to be one half of the wavelength $\lambda$ in use, as mentioned in the foregoing. More specifically, the first magnetic layer 13 and the second magnetic layer 15 at a portion corresponding to the pin-hole in the first magnetic layer 13 are made to coexistent at a substantially equal optical position. The refractive index of this spacer layer 14 may take any arbitrary value, so that, by use of SiO, $Al_2O_3$, etc. excellent in moisture-resistant property, it is possible to prevent the magnetic characteristic and the external appearance of the recording medium from being deteriorated.

Figure 4:
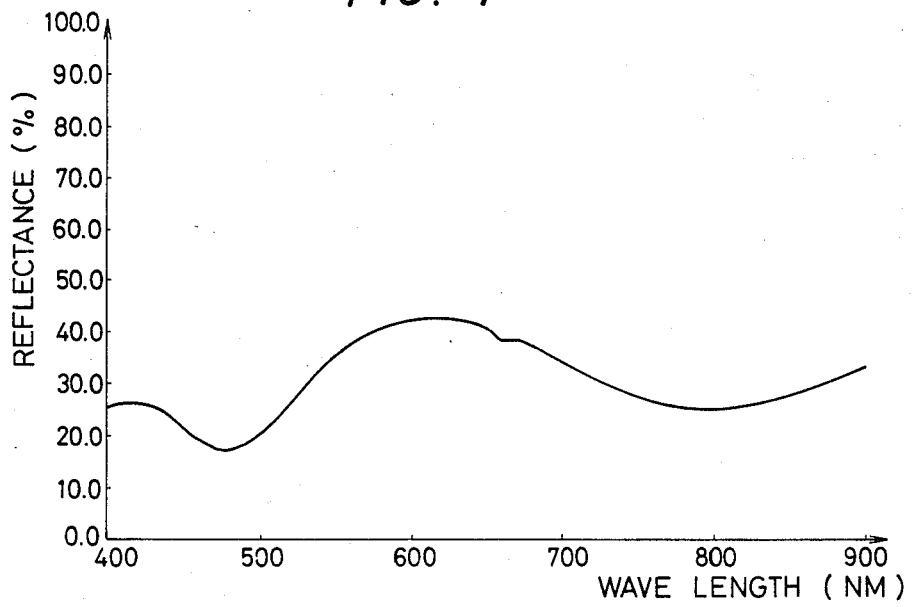
FIG. 4 is a graphical representation showing spectral reflectance of the recording medium shown in FIG. 3.

FIG. 4 is a graphical representation showing a spectral reflectance characteristic of the first magnetic layer at the position of the pin holes. Same as that shown in FIG. 1, the recording medium is constructed with the reflection-preventive layer 12 of $ZrO_2$ having a refractive index of 2.0 and an optical film thickness of 160 nm, the magnetic layer 15 of GdTbFeCo having complex refractive index of 2.53-3.31 at a wavelength of 800 nm and a film thickness of 100 nm or so which does not permit light to pass through it, and the spacer layer 14 of $ZrO_2$ in an optical film thickness of 400 nm.

Figure 2:
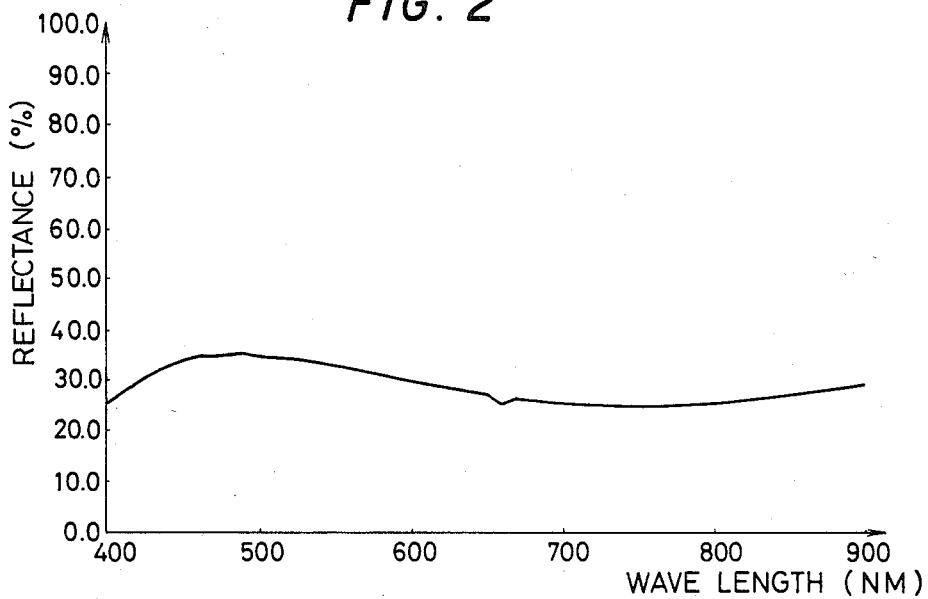
FIG. 2 is a graphical representation showing the spectral reflectance of the magneto-optical recording medium shown in FIG. 1.

Upon comparison of the characteristic curve in FIG. 4 with that shown in FIG. 2, it will be seen that there is no substantial difference in the reflectance at the location where the pin hole is present and at the location where the pin hole is not present, from which the optical effect of the spacer layer 14 is evident. According to this embodiment of the present invention, therefore, the reflection-preventive effect and the Kerr rotational effect at the location where the pin hole exists are almost same as those at the location where such pin hole is non-existent.

In the embodiment shown in FIG. 3, the first magnetic layer 13 and the second magnetic layer 15 may be made of difference materials, and the reflection preventive layer 12 and the spacer layer 14 may also be made of difference materials. Further, the reflection preventive layer 12 may be formed in plural.

As described in the foregoing, the recording medium of the present invention is of such a construction that at least two recording layers are provided to enable the information recording to be effected on the second recording layer in place of the first recording layer, whenever the latter has the defect such as pin hole, hence it has its remarkable effect of decreasing error rate to a considerable extent.

What we claim is:

1. An optical recording medium, comprising:
   (a) a first recording layer;
   (b) a second recording layer provided in contiguity to said first recording layer; and
   (c) a separation layer for spatially separating said first and second recording layers;
   said first recording layer having a sufficient film thickness not to permit the recording to be effected on said second recording layer, while the recording operation is performed on said first recording layer, and said recording operation being effected on said second recording layer at positions corresponding to defective portions in said first recording layer,
   said separation layer having an optical film thickness corresponding to an integral multiple of one half of a wavelength $\lambda$ of the recording light beam,
   wherein said separation layer has such function that permits the recording to be effected on said second recording layer with the same effeciency as that of the recording on said first recording layer, when said recording operations are effected on said second recording layer in accordance with the defects in said first recording layer.

2. The optical recording medium as set forth in claim 1, wherein said first and second recording layers are magneto-optical recording layers.

* * * * *